(No Model.)

L. C. SMITH.
GRAIN SAMPLER.

No. 258,488. Patented May 23, 1882.

WITNESSES
Philip C. Mann
E. H. Bates

INVENTOR
Lewis C. Smith
by Anderson & Smith
his ATTORNEYS

UNITED STATES PATENT OFFICE.

LEWIS C. SMITH, OF BERLIN, WISCONSIN.

GRAIN-SAMPLER.

SPECIFICATION forming part of Letters Patent No. 258,488, dated May 23, 1882.

Application filed April 8, 1882. (No model.)

To all whom it may concern:

Be it known that I, LEWIS C. SMITH, a citizen of the United States, resident at Berlin, in the county of Green Lake and State of Wisconsin, have invented a new and valuable Improvement in Grain-Samplers; and I do hereby declare that the following is a full, clear, and exact description of the construction and operation of the same, reference being had to the annexed drawings, making a part of this specification, and to the letters and figures of reference marked thereon.

Figure 1:
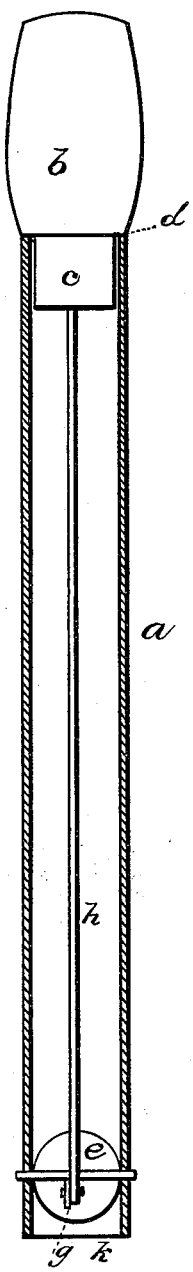
Figure 2:
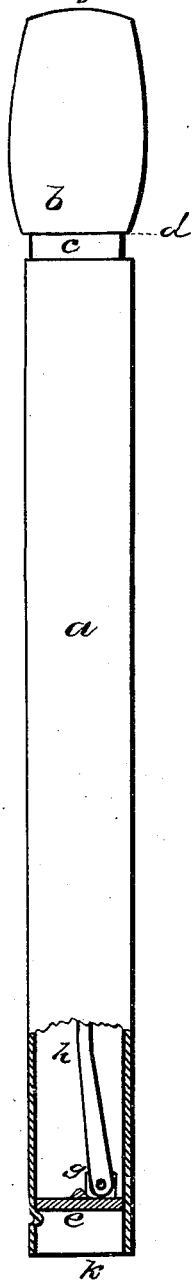

Figure 1 of the drawings is a vertical sectional view of my grain-sampler; and Fig. 2 is a side view, part sectional, of the same.

This invention has relation to devices for sampling grain in sacks, bins, cars, &c.; and it consists in the construction and novel arrangement, in connection with an elongated sampling-tube, of an interior valve pivoted at or near one end thereof, a handle having a short stem portion or guide in the other end of the tube, a shoulder engaging this end of the tube, and an interior rod connecting the handle to the valve eccentrically, all as hereinafter set forth.

In the accompanying drawings, the letter $a$ designates a metallic tube open at both ends, and $b$ indicates the handle thereof, having a stem or guiding portion, $c$, which extends into one end of the tube. An outer annular shoulder or stop, $d$, on the handle serves to engage the end of the tube when the handle is pushed into the end thereof the full length of its stem portion $c$. In the other end of the tube is transversely or diametrically pivoted a thin plate-valve, $e$, the form of which is similar to that of a cross-section of the tube, and which is designed, when turned transversely, to close the tube at this end. The valve-plate $e$ is provided at one side of its diametric axis with an eccentric pivot-bearing, $g$, whereby the lower end of the rod $h$ is connected thereto, the upper end of said rod being fastened to the handle. The length of this rod is such that when the handle is pushed into the tube the length of its stem portion, bringing its stop or shoulder $d$ into contact with the edge of the tube, the plate-valve $e$ will be turned in the direction of the length of the tube. In this manner the mouth end, $k$, of the tube is opened and held open automatically as the tube is pushed into the mass of grain, a sample of which may be desired. The thin plate-valve forms no obstruction, and the grain readily enters the tube. In withdrawing the tube the handle moves first in a reverse manner, closing the plate-valve across the mouth portion of the tube automatically. This tube will be found convenient in sampling sugar and other articles.

Having described this invention, what I claim, and desire to secure by Letters Patent, is—

A grain-sampling tube having an interior valve diametrically pivoted at or near one end thereof, a handle having a short stem portion or guide in the other end thereof, a shoulder or stop on the handle, and an interior rod connecting the handle to the valve eccentrically, substantially as specified.

In testimony that I claim the above I have hereunto subscribed my name in the presence of two witnesses.

LEWIS C. SMITH.

Witnesses:
ALMON BRIDGMAN,
CHAS. M. DODSON.